United States Patent [19]

Steinbruchel

[11] 3,901,768

[45] Aug. 26, 1975

[54] DISTILLATION METHOD AND APPARATUS

[75] Inventor: Armando B. Steinbruchel, San Diego, Calif.

[73] Assignee: Aqua-Chem, Inc., Milwaukee, Wis.

[22] Filed: Sept. 28, 1973

[21] Appl. No.: 401,182

Related U.S. Application Data

[63] Continuation of Ser. No. 186,179, Oct. 4, 1971, abandoned.

[52] U.S. Cl. ................................. 202/174; 159/18
[51] Int. Cl. ......................... B01d 3/02; B01d 1/26
[58] Field of Search ........ 159/2 MS, 18, 17 P, 17 R, 159/17 C, 17 VS, 28 R, 28 VH, 13 B, D8, 13 A; 202/173; 203/6, 7, 10, 11, 34, 35, 50

[56] References Cited
UNITED STATES PATENTS

| | | | |
|---|---|---|---|
| 1,028,738 | 6/1912 | Kestner | 159/27 B X |
| 1,156,338 | 10/1915 | Zwingenberger | 159/20 |
| 1,200,996 | 10/1916 | Soderlund & Boberg | 159/13 B X |
| 1,536,894 | 5/1925 | Lillie | 159/13 B |
| 2,703,610 | 3/1955 | Cross | 159/17 |
| 3,119,752 | 1/1964 | Checkovich | 203/7 |
| 3,135,670 | 6/1964 | Ristaino et al. | 203/7 |
| 3,218,241 | 11/1965 | Checkovich | 203/7 |
| 3,249,517 | 5/1966 | Lockman | 202/159 |
| 3,303,106 | 2/1967 | Standiford, Jr. | 203/27 |
| 3,304,242 | 2/1967 | Lockman | 202/173 |
| 3,344,041 | 9/1967 | Wulfson | 203/11 |
| 3,351,120 | 11/1967 | Goeldner | 159/13 R |
| 3,389,059 | 6/1968 | Goeldner | 203/1 |
| 3,476,654 | 11/1969 | Sieder | 203/7 |
| 3,481,835 | 12/1969 | Carnavos | 202/174 |
| 3,487,873 | 1/1970 | Bromley et al. | 159/13 A |
| 3,499,827 | 3/1970 | Cox | 202/173 |
| 3,627,646 | 12/1971 | Osdor | 159/18 X |
| 3,697,383 | 10/1972 | Weaver | 202/174 |
| 3,734,835 | 5/1973 | Spicacci | 202/173 X |

FOREIGN PATENTS OR APPLICATIONS

| | | | |
|---|---|---|---|
| 176,175 | 10/1906 | Germany | 159/13 B |

*Primary Examiner*—Jack Sofer
*Attorney, Agent, or Firm*—Fred Wiviott

[57] ABSTRACT

A thin film evaporator having a plurality of serially connected effects arranged in a vertical array and operated at successively lower temperatures and pressure. A portion of the liquid fed over heat exchange tubes as a thin film is vaporized to condense vapor passes therethrough. The unevaporated feed liquid is passed through successive effects and the vapor generated in each effect is employed as the vapor for the next effect. The heat exchange tubes of at least one of the initial effects is arranged generally vertically and those in the balance of the effects are arranged generally horizontally and extend radially with their outlet ends facing condensate collecting chambers disposed within a central core. Feed liquid preheaters extend vertically through each effect with a feed liquid takeoff for each effects to preheat the feed liquid for each effects only substantially to the level required for that effects. Acid treatment for the prevention of scale is provided to the feed liquid of the effects operated above about 195°F and polyphosphate scale treatment is provided to the feed water for the lower temperature effects.

14 Claims, 8 Drawing Figures

FIG.1

POLYPHOSPHATE TREATED FEEDWATER ———————
ACID TREATED FEEDWATER —·—·—·—·—·—

DISTILLATION METHOD AND APPARATUS

This is a continuation of application Ser. No. 186,179, filed Oct. 4, 1971 now abandoned.

BACKGROUND OF THE INVENTION

This invention relates to the distillation of liquids and more specifically to multieffect, thin film evaporators having particular, but not exclusive, application to the desalination of sea water.

There are a variety of methods and apparatus which have been employed for the desalinization of brackish or sea water. Certain of these prior art distillation apparatus were not wholly satisfactory, however, because of their relatively limited capacity. Other types of apparatus capable of handling large quantities of water were inherently inefficient so that production costs were disproportionally higher than with conventional water sources.

The type of distillation apparatus to which the present invention relates is a thin film evaporator having a plurality of effects. Each effect includes heat exchange tubes through which vapor is passed while the feed liquid is distributed as a thin film over their outer surfaces. A first portion of the vapor condenses within the tubes and a second portion condenses on the feed water preheaters. The condensate is collected as the product distillate of the system. The heat released upon the condensation of the vapor within the heat exchange tubes evaporates a portion of the feed liquid which becomes the vapor for the next succeeding phase and the unevaporated portion is collected as the succeeding effect feed liquid.

One of the major losses which occurs in the distillation apparatus employed for the desalinization of sea water results from the fact that sea water at a given pressure boils at a higher temperature than the distillate. Thus, the temperature required to boil the brine is greater than that of the generated vapor which is the heat source for the next succeeding effect. This temperature loss increases with the concentration of the brine being distilled. It is, therefore, necessary in thin film evaporators to provide sufficient feed water to prevent undue brine concentration. On the other hand, because it was necessary in prior art structures to preheat all of the feed water to substantially the temperature of the first effect, the use of large quantities of such feed water required a large energy input.

It is also well known that in the desalinization of sea water, suitable chemical treatment is required to prevent the formation of apparatus scale on the heat exchange surfaces of the system which would markedly reduce inefficiency. Below temperatures of about 195°F the predominant scale consists of $CaCO_3$ which is formed by the combination of calcium and carbonate ions, both of which are present in sea water at the elevated tempertaures employed in desalinization apparatus. Polyphosphate is effective for controlling scale formation at such temperatures by depressing the reaction which forms $CaCO_3$ and by holding in suspension any such material which may be formed.

Above about 195°F the predominant scale former is magnesium hydroxide. This material is formed by the reaction of carbonate ions with water to form hydroxide ions which in turn react with magnesium ions to form $Mg(OH)_2$. The common treatment to prevent the formation of this material consists of an acid solution such as sulfuric, hydrochloric, nitric, phosphoric, etc. These acid solutions provide hydrogen ions which react with carbonate ions to form carbon dioxide and water. Such acid treatment is also effective to suppress the formation of $CaCO_3$, but is substantially more expensive than polyphosphate. However, full acid treatment was generally employed in prior art apparatus operating at temperatures in excess of 195°F.

A third material which may cause scale formation is $CaSO_4$ which occurs if the brine becomes unduly concentrated, particularly in the lower temperature effects of a multieffect system. The formation of this material is suppressed by providing sufficient feed water. Here again, this created a problem in prior art apparatus because the entire quantity of feed water was generally heated to the temperature of the initial effect.

SUMMARY OF THE INVENTION

It is an object of the invention to provide a new and improved multieffect thin film evaporator.

A further object of the invention is to provide a new and improved method for the distillation of liquids.

Another object of the invention is to provide a distillation method and apparatus capable of providing potable water at a relatively low cost.

Still another object of the invention is to provide a multieffect thin film evaporator and method having improved thermodynamic efficiencies.

A still further object of the invention is to provide distillation method and apparatus wherein a substantial portion of the feed liquid provided to each effect is heated substantially only to the temperature of that effect.

A further object of the invention is to provide a multieffect distillation method and apparatus having dual acid and polyphosphate scale treating systems.

Yet another object of the invention is to provide a multieffect thin film evaporator method and apparatus wherein a quantity of feed liquid is provided to each effect which is unconcentrated in the previous effects.

Certain objects of the invention are achieved by a multieffect thin film evaporator method and apparatus in which the evaporated and unevaporated feed liquid from each effect is provided as the vapor and feed liquid of the next succeeding effect, and wherein an initial quantity of feed liquid is provided to the initial effect and an additional quantity of feed liquid which is unconcentrated in the previous effect is provided to each succeeding effect. Other objects of the invention are provided by heating the initial portion of the feed liquid to only substantially the temperature of the initial effect and heating the additional feed liquid portions substantially only to the temperature of the effect in which it is employed. Further objects of the invention are accomplished by operating an initial plurality of effects at a temperature above 195°F and the remaining effects at lower temperatures and providing for the addition of acid to the feed liquid supplied to the initial plurality of effects and polyphosphate to the feed liquid of the remaining effects.

The accomplishment of other objects of the invention will become apparent from the detailed description of the invention taken with the accompanying drawings.

DETAILED DESCRIPTION OF THE PREFERRED EMBODIMENT

Figure 1:
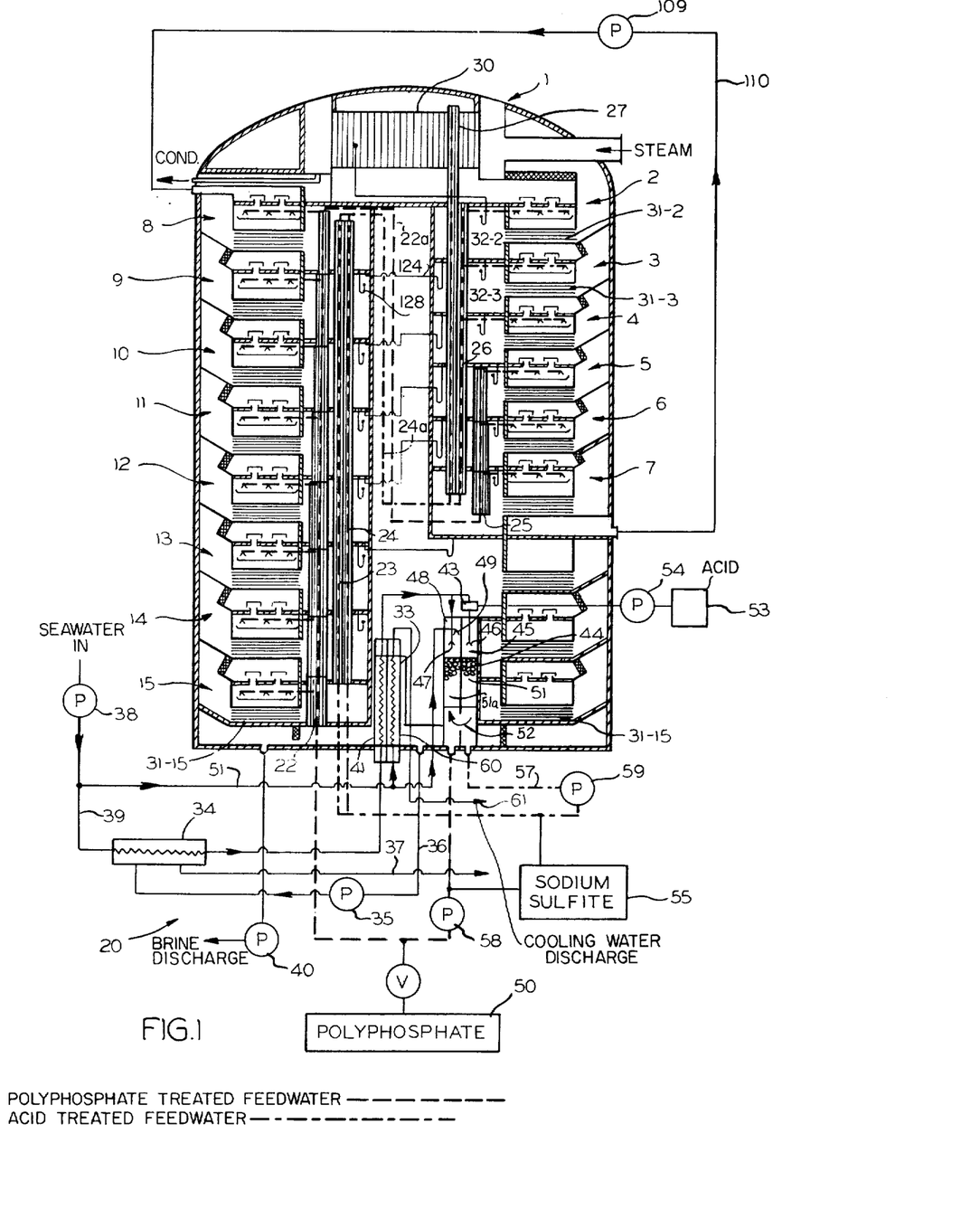
FIG. 1 schematically illustrates the distillation apparatus and method according to the present invention.

FIG. 1 schematically illustrates a multieffect distillation apparatus which will be discussed in relation to the distillation of sea water, although the inventive concept may also be employed for the distillation of other liquids as well. Those skilled in the art will also appreciate that the number of effects may vary with requirements and the design parameters of the system. The illustrative embodiment, by way of example, is shown to have fifteen effects numbered 1–15.

When the system is employed for the distillation of sea water, the latter initially passes through a heat rejection and chemical treatment system 20 where it is preheated, receives chemical pretreatment, is deaerated and degassed. The water is then passed through a preheater system consisting of preheater tube bundles 22, 23, 24, 25, 26 and 27 which are constructed and arranged such that the seawater feed for each effect passes successively through the distillate collection portion of each preceding effect where it is preheated by a portion of the vapors condensed in each such effect. At each effect, also, part of the preheated seawater is added to the unevaporated brine feed entering from the preceding effect to compensate for water evaporated in the preceding effect and any additional amount required to assure a totally wetted surface on the evaporator tubes and to prevent undue brine concentration.

Effect 1 may receive saturated steam at a suitable temperature, such as 247°F, for example, from any available source, such as a steam generator. The final portion of the feed water remaining after passage through the first 14 stages in the preheaters 26 and 27 will be raised to an elevated temperature, such as approximately 229°F, in the illustrated example. A portion of the steam is employed to elevate this feed water portion to approximately 240°F in the last portion of preheater 27. The major portion of the steam provided to effect 1 condenses on the exterior of the heat exchange tubes 30 to evaporate a portion of the feed water passing as a thin film through the interior of said tubes. This evaporated feed water or vapor is conducted to the interior of the tubes 3102 of effect 2 (see FIG. 2) and the unevaporated portion of the feed water is combined with a slip steam of feed water from the preheater 26 and then distributed as a thin film over the outside of tubes 31-2. A portion of the total vapor passing to effect 2 is condensed within the tubes 31-2 and the remaining vapor is condensed on the outside surface of preheater tubes 26 and 27 within the second effect distillate collecting chamber 32-2.

The distillate collected in effect 2 may then be delivered by pipe 124 to the distillate chamber of one of the lower pressure effects, such as chamber 32-8 where a lower pressure causes a portion of the distillate to be flash evaporated. This vapor is combined with the uncondensed vapor from heat exchange tubes 31-8 of effect 8 for condensation on the preheater tubes 22, 23 and 24. Similarly, the condensate from effect 8 is further flashed down through the remaining effects by pipes 28.

The distillation procedure just discussed is repeated in each evaporator effect. In effect 15, the vapor is condensed in the final condenser 33 which heats the incoming sea water make-up stream. The condensate from effect 15 is added to the product water produced in the other effects and is then passed by pump 35 and conduits 36 and 37 through the distillate coller 34 which also acts as a preheater for the incoming sea water. The brine from effect 15 is passed by pump 40 back into the sea and the condensate from effect 1 is returned to the source steam system.

Referring again to the intake system 20, sea water is introduced into the system by a sea water pump 38 a first portion of whose output is passed by a conduit 39 through the distillate cooler 34 where it extracts heat from the evaporator distillate. The warmed sea water is then passed through a first portion 41 of final condenser 33 after which it is split into two streams. One stream passes through a mixer 43 where it is blended with a suitable acid solution of known concentration. This stream is then sprayed into a first chamber 45 of a deaerator 44 through a nozzle 46 fabricated of a suitable corrosion resistant material, such as stainless steel. The second preheated sea water stream is injected by a similar nozzle 47 into a second chamber 48 of the deaerator 44 and after exiting therefrom is treated with polyphosphate from a container 50.

Alkaline scale in desalination apparatus is caused by the reactions of bicarbonate ions, water and ions of calcium and magnesium. Common acids, usually organic, such as sulphuric acid, hydrochloric acid, phosphoric acid, nitric acid, sodium bisulphate, solfonic acid, citric acid, etc, as well as acid salts such as sulphuric, chloride and aluminum sulphate are effective to suppress alkaline scale formation by providing hydrogen ions which react with bicarbonate ions to form carbon dioxide in water.

Polyphosphate treatment is effective for controlling the formation of Ca $CO_3$ scale which is predominant at operating temperatures below about 195°F by depressing the reaction which forms this compound. This treatment is used in the feed treatment for effects 5–15 which operate up to approximately the temperature. However, polyphosphate is not effective to prevent the formation of scale at temperatures above about 195°F where the predominant scale formation consists of $Mg(OH)_2$. For this reason, acid treatment is provided for effects 1–4 which operate above this temperature. It has been found that this dual chemical treatment system substantially reduces operation costs of the system because of the substantially lower cost of polyphosphate with respect to acid.

A variety of such polyphosphates are effective for prevention of scale formation such as, for example, tetrasodium syrophosphate, sodium tripolyphosphate and sodium hexametaphosphate. For the treatment of sea water, an acceptable rate of polyphosphate addition in the range of 0.5–10 parts polyphosphate per million parts of feed water.

It is preferred that the acid be added to the pretreated feed in a generally continual basis, i.e. to a major portion of the pretreated feed stream and during about 50 percent or more of the feed time. It is preferred that sufficient acid be added in the mixer 43 to initially reduce the alkaline in the sea water to a level equal to about 1–30 parts per million of $CaCO_3$ of $Mg(OH)_2$. Acid may be provided to the mixer 43 from a container 53 by an acid pump which is controlled by a pH sensor 55 coupled to the output of acid feed water pump 56. It is preferrable that the pH of this feed water be maintained at about 7.2 to 7.4. The pH sensor 55 will be of a type well known in the art which controls the output of acid pump 55 so that the rate of acid feed will be increased or decreased if the pH of the acid feed water falls below or rises above the preferred range.

The deaerator 44 is of the vacuum, packed column type, consisting of separate sections 45 and 48. As indicated above, feed water streams, which have been partially heated in the distillate cooler 34 and final condenser 33 and are introduced into sections 45 and 48 through spray nozzles 46 and 47 respectively. In addition, unheated sea water is sprayed into chamber 48 through nozzle 49 and conduit 57 so that flashing of both make-up streams occurs since this cold water spray maintains the vapor pressure in the deaerator 44 at approximately 2°F lower than the temperature of the feed water. The flashed vapors from the acidified sea water make-up stream flow with the liquid through the deaerator packing bed 58 where the flashed vapors then pass through an opening between the chambers into the phosphate section 48 as indicated by the arrow 59 and upwardly through the packing bed 51. This upward passage of vapor tends to scrub the stream entering at nozzle 47 as it flows through the deaerator packing 51 to enhance the removal of dissolved gasses.

The deaerated sea water collected in the lower portion of the chamber 48 receives the phosphate treatment while being fed by pump 58 to the heat exchanger 22 where a portion is drawn off at effects 15 to 8 and the remainder delivered by pipe 22a to the lower end of heat exchanger 25. The acid treated deaerated sea water from chamber 45 is fed through pipe 57 by pump 59 to each of the feed water preheaters 23 and 24. Feed water preheaters 23 and 24 pass upwardly through effects 15 to 8 and then flows through pipe 24a to the lower end of preheaters 26 and 27 for passage through effects 7 to 5 prior to delivery to effects 4 to 1.

During the acidification of the sea water, a quantity of $CO_2$ is evolved. This gas as well as air dissolved in the incoming sea water is substantially removed in the deaerator 44 by a vacuum system (not shown). The removal of these gases minimizes corrosion in the evaporator and limits the amount of noncondensable gases which could impair and reduce the effectiveness of the heat transfer portions of the apparatus. In addition, sodium sulphite may also be introduced into the acid and phosphate treated feed water streams from container 55 to remove any remaining dissolved oxygen. Means not shown, but which are well known in the art, are provided at each effect for venting such noncondensables as may appear in the system.

In addition to the heated sea water which is provided to the deaerator 44, a second portion is provided as a cooling medium to the section 61 of the final condenser 33 and is then discharged through conduit 62.

Figure 2:
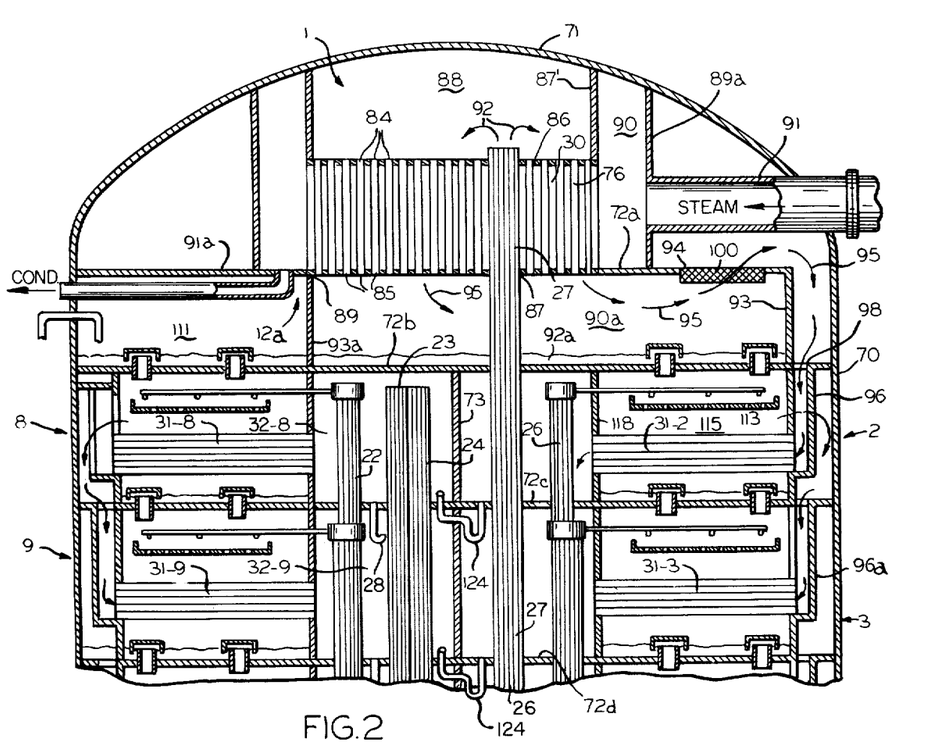
FIG. 2 is a sectional view of a portion of the distillation according to a preferred embodiment of the invention.

Referring now to FIG. 2, the distilling apparatus according to the preferred embodiment of the present invention is shown to be disposed within a cylindrical outer metallic shell 70 having a closure dome 71 at its upper end which may have a spherical shape for greater strength. The entire assembly may be mounted upon a suitable base, such as a concrete slab (not shown). As those skilled in the art will appreciate, the shell 70 may be suitably stiffened by structural members (not shown). The outer surface of the shell may also be covered with insulation to reduce heat loss and lower the thermal gradient. A plurality of horizontal diaphragm walls 72a, 72b, 72c, etc. separate the effects vertically one from the other and a vertical diaphragm wall 73 separates effects 2–7 from effects 8–12. Wall 73 does not extend below effects 7 and 12 because effects 13, 14 and 15 each occupies an entire level of the vessel 70. It will be appreciatd that the diaphragm walls may also be suitably reinforced with structural members (not shown). A cylindrical access shaft 75 (see FIGS. 5 and 6) may extend from the base to the floor of effect 1 and doubles as a structural column.

Figure 3:
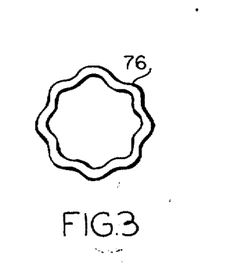
FIG. 3 is a sectional view of certain of the heat exchange tubes of the apparatus of FIG. 2.

Referring again to FIG. 2, the feed water preheater bundles 22, 23, 24, 25, 26 and 27 are located in the center portion of the evaporator shell 70 and progressively pass through the condensate collecting chambers 32-15 to 32-2 of effects 15 to effect 2. Each preheater consists of bundles of vertically oriented tubes 76 which may have the double fluted enhancement configuration as shown in FIG. 3. Some of the tubes of the preheaters 22-27 pas uninterrupted from one effect to the other in a sealing relation through the diaphragm walls 72 while other of said tubes terminate at each effect to permit partial withdrawl of feed water to the evaporator structure of that effect. As a result, the feed water stream flowing through the preheater tube bundles 22–26 becomes progressively smaller. The preheating bundles, therefore, may also be reduced in size whereby bundle 22 is the smallest at effect 8, bundle 25 at effect 5 and bundle 26 at effect 2 (see FIG. 1). Bundle 27, however, continues uninterrupted to effect 1. Water boxes 81 may be provided at each effect as the upper terminus of the heat exchange tubes providing feed water to that effect or the respective heat exchange tubes may merely branch off.

As shown in FIG. 2, effect 1 may include a vertically oriented tube bundle 30 which consists of individual tubes arranged annularly about the preheater 27 disposed at its core. The individual tubes of bundle 30 may be of the double fluted enhanced type as shown in FIG. 3 and are secured in a sealed relation in suitable openings 84 and 85 formed respectively in upper and lower tube sheets 86 and 87. A vertical annular wall 87 extending from the outer margin of upper tube sheet 86 to the dome 71 forms a feed water distribution chamber 88 above tube bundle 30 for receiving feed water from the preheater 27. The lower tube sheet 87 is disposed in a circular opening 89 formed in diaphragm wall 72a which defines the upper margins of vapor separating chamber 90a from effects 2 and 8.

A second annular wall 89a surrounds the tube bundle 30 and extends between the diaphragm wall 72a forming the lower margin of effect 1 and the dome 71 for defining the steam chamber 90 surrounding tube bundle 30. A first relatively large diameter pipe 91 extends through the dome 71 and terminates in a sealing relation at the wal 89a for coupling the chamber 90 to a suitable source of steam, such as the steam system of a steam turbine. A second pipe 91a is coupled to the lower end of chamber 90 for conducting condensate back to the steam source.

In operation of effect 1, the warmed feed water represented by arrow 92 is conducted through preheater 27 to the distribution chamber 88 and then passes downwardly as a thin film through the interior of the tubes of bundle 30. Steam is delivered from pipe 91 to bundle 30 in the radial direction to evaporate a portion of the feed water 92 falling through the interior of tubes 30 and to preheat a portion of the feed water flowing upwardly through preheater bundle 27. The heating system condenses in chamber 90 and is returned to the steam supply system through pipe 91a. The latent heat of vaporization, liberated by the condensation of the steam, vaporizes a portion of feed water 92 passing downwardly through the tubes bundle 30. This vapor generated in effect 1, and symbolized by arrows 95, passes into vapor separating chamber 90a disposed at the outlet side of tubes 30 and formed by diaphragm walls 72a and 72b and vertical walls 93 and 93a. The unevaporated portion of the feed water 92a collects on the floor of chamber 90a.

A passage for the vapor 95 from the chamber 90a of effect 1 to the horizontal heat exchange tubes 3102 of effect 2 is formed by an opening 94 in wall 72a, the space between walls 93 and the shell to and a chute 96 extending downwardly between an aperture 98 formed in diaphragm wall 72b and the entrance end of heat exchange tubes 31-2. A demister element 100 is disposed in opening 94 to remove entrained droplets of brine from the vapor passing through it.

Figure 4:
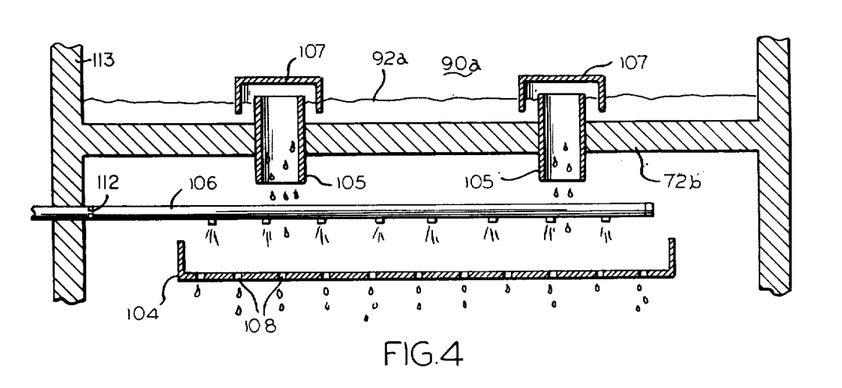
FIG. 4 is a fragmentary view of a portion of the distillation apparatus feed liquid distribution system.

In the feed water system of the preferred embodiment of the present invention, each evaporator effect is supplied with brine from the previous effect and a portion of newly treated, but unconcentrated, feed water. As illustrated in FIG. 4 with respect to effect 2, feed water mixing is performed in a distributing tray 104 suitably supported above its respective tube bundle. The concentrated brine 92a is supplied to the tray 104 from chamber 90a by means of a pair of overflow pipes 105 which extend vertically through diaphragm wall 72b and above tray 104. The feed water is flash cooled to the boiling temperature of effect 2 as it passes through pipes 105.

The overflow pipes 105 extend above the wall 72b and are covered by vapor caps 107 which are spaced from the upper ends of pipes 105. The lower ends of caps 107 extend downwardly below the upper ends of pips 105 and below the surface of feed water 92a to provide a vapor seal between effects. The pipes 105 also serve to eliminate the draw-off of liquid from the floor of effect 1 and allows solids, such as corrosion products to settle out.

Unconcentrated feed water is provided to distributing tray 104 by means of feed water pipe 106 which extends from the water box 81 associated with effect 2. Pipe 106 may have a plurality of small nozzles 109 distributed longitudinally and oriented downwardly. The distributing tray 104 is provided with a plurality of small apertures 108 which evenly distributes the feed water over the evaporator tubes. An orifice 112 within the pipe 106 controls the flow of feed water such that a thin film of liquid is maintained on the outer surface of the tubes without exceeding the wetting requirements. In addition, feed water injected through pipe 106 will approximately equal that evaporated in effect 1 and compensate for the increase in tube surface areas between effects 1 and 2 to insure the effective wetting of the tubes in successive effect remains approximately constant. It will be appreciated that a similar feed water tray 104 and pipe 106 are associated with each heat exchange tube bundle 31 of each effect.

The unevaporated feed water from each effect is similarly conducted to the succeeding effect and mixed with unconcentrated feed water. As the feed water proceeds through the various effects of the system, it becomes more concentrated as its component water is evaporated in the various effects. The brine collects at the bottom of effect 7 and is then pumped by a brine transfer pump 109 (see FIG. 1) through a pipe 110 and into a feed water chamber 111 disposed above effect 8. The cascading of the feed water continues through effects 8–15 with the unevaporated brine collected in effect 15 being discharged by pump 40.

As indicated hereinabove, as the feed water 92a rains downwardly from the distributor tray 104 and onto the heat exchange tubes 31-2 in effect 2, a portion of the steam within the tubes condenses and collects within the distillate chamber 32-2 at the outlet end of said tube bundle. The remaining portion of the vapor is condensed on the outside surface of the preheater tubes 26 and 27 disposed within chamber 32-2.

Because the additional unconcentrated feed water provided to each effect passes through its own condensate collecting chambers as well as those of all previous effects, the temperature of this feed water will be substantially the same as the vapor and feed water exiting to the next succeeding effect. Thus, the temperature to which each such quantity of additional feed water is heated will be no higher than that of the effect in which it is employed. For example, assume that in the preferred embodiment of the invention 247°F steam is employed. The feed water in preheater 27 will be raised to a temperature of about 229°F in the 14 preceding effects and to about 240°F by the steam in stage 1. The vapor and feed water passing from effect 1 to effect 2 is at approximately 240°F and this feed water is mixed with additional feed water which is also heated to approximately 229°F in effects 2–14. Similarly, the water and vapor exiting from stage 2 is at 229°F while the additional feed water to effect 3 is heated to approximately 217°F in effects 3–14. The temperature of the feed water to each succeeding effect is lower with that in effect 15 being 105°F which is substantially the same as that of the discharge brine.

In this manner, the additional feed water provided to each effect is heated only substantially to the temperature of that effect so that it is not necessary to preheat all of the feed water to the elevated temperature of the initial effect. For this reason, the thermal efficiency of the system is substantially increased without undue brine concentration. In addition, by providing feed water individually to each effect, the less expensive phosphate scale treatment may be employed in the lower temperature effects.

Figure 5:
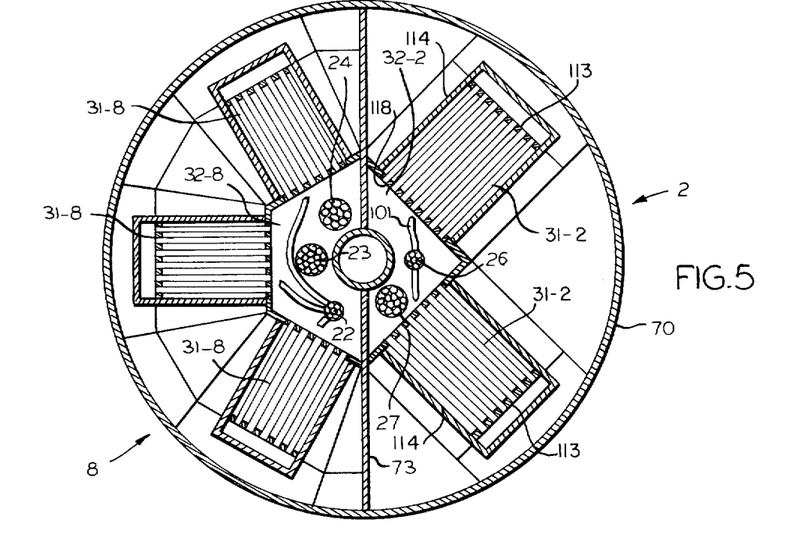
FIGS. 5 and 6 are horizontal section of the distillation apparatus according to the present invention and illustrating the arrangement of the heat exchange tube bundles at various effects.
Figure 6:
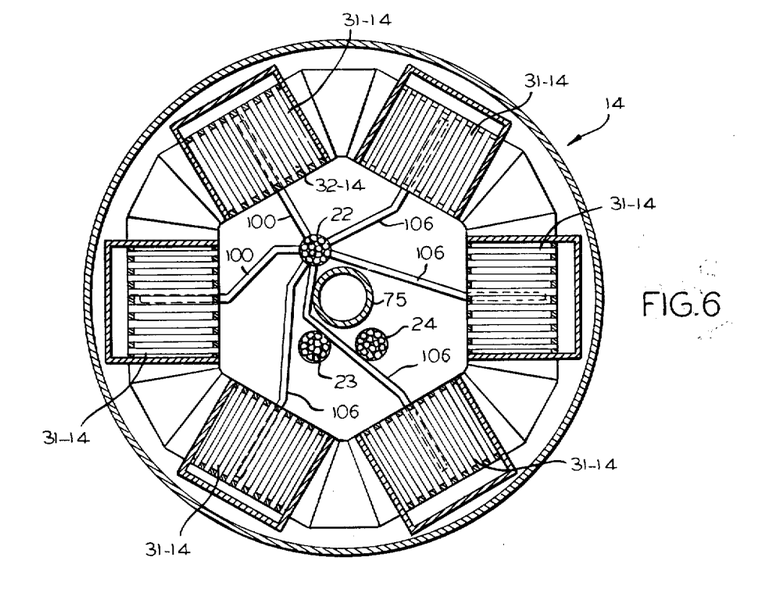

Referring now to FIGS. 5 and 6, each effect may include a plurality of heat exchange tube bundles. For example, effect 2 is shown in FIG. 5 to include two bundles 31-2, effect 8 is shown to include three bundles 31-8 and effect 14 is shown in FIG. 6 to include six bundles, 31–14. It will be appreciated that successive stages will operate at successively lower temperatures and pressures. It is desirable to increase the number of tube bundles in this fashion so as to increase the space for the release of vapors in the lower temperature and pressure stages. This is facilitated by the circular array of heat tube bundles at the various levels wherein the horizontal bundles of effects 2–15 extend radially relative to the axis of shell 70. This orientation of heat tube bundles allows all of the heat tube bundles to discharge vapor directly on the preheater tubes 22, 23, 24, 25, 26 and 27 disposed within the respective condensate chambers 32. Further, the radial array of heat tube bundles accommodates a reduction in volume of the heating vapors as it flows from the inlet ends of the bundles to the outlet ends which open into the respective condensate chambers 32 at the center of the array.

Figure 7:
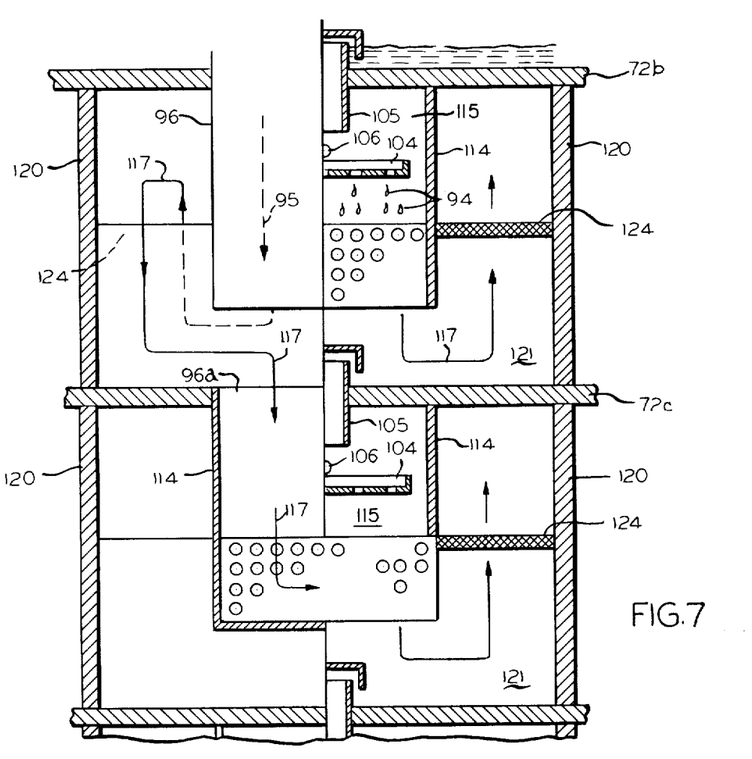
FIG. 7 is a fragmentary view of the distillation apparatus showing the vapor path between effects.
Figure 8:
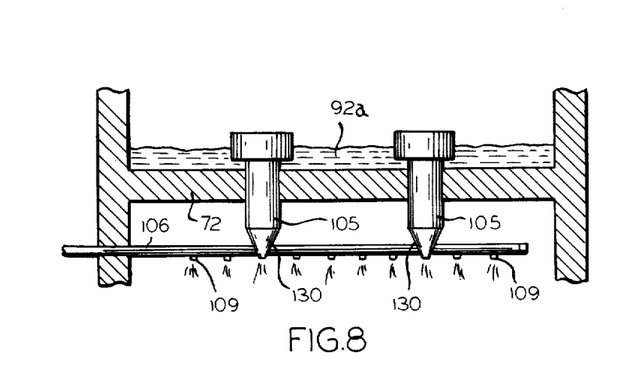
FIG. 8. is a fragmentary view of a modified distillation feed liquid distribution system similar to that shown in FIG. 4.

The feed water and vapor separating chambers associated with each of the horizontal heat tube bundles of effects 2–15 are substantially identical and, accordingly, only that associated with one of the tube bundles of effect 2 will be discussed for the sake of brevity. As seen in FIGS. 2, 4 and 7, a vertical front wall 113 and partial side wall 114 respectively separate the feed water chamber 115 from the vapor symbolized by arrow 95 entering from effect 1 and the vapor symbolized by the arrow 117 exiting to effect 2. In addition, a back wall 118 separates the feed water chamber from the condensate collecting chamber 32-2. A second pair of side walls 120 are spaced from the heat tube bundle 31-2 and extend vertically between diaphragm walls 72b and 72c. In addition, a pair of demister elements 124 extend along the sides of the tube bundle 31-2 and between the lower ends of each of the walls 114 and the side walls 120. These demister elements 124 may be of any conventional type well known in the art such as the monel wire mesh type or hook and vane separators.

As the feed water 92a rains downwardly from the distribution tray 104 onto the tube bundle 31-2, a portion is vaporized while the remainder collects in the vapor separating space 121 below the tube bundle. The vapor 117 travels outwardly from the heat tube bundle 31-2 toward the side walls 120 and then upwardly through the demister elements 124 and then forwardly and around the chute 96 before passing into the upper end of chute 96a of effect 2.

Referring again to FIG. 2, a pipe 124 may be provided to conduct the distillate collected in chamber 32-2 of effect 2 to the distillate chamber 32-8 of effect 8, where a portion is converted to vapor by flashing and then condenses on the heat exchange tubes 22, 23 and 24 for combination with the product water from that effect. The condensate collected in effect 8 is, in turn, further flashed down in successive effects 9 to 15 through pipes 28. Similar pipes, such as pipe 125 which couples distillate collecting chambers 32-3 to 32-9, transfers distillate from effects 3-7 to effects 9-13, respectively.

The preferred embodiment of the invention just described provides increased thermodynamic efficiency by heating the feed water provided to each effect to substantially the temperature of the effect itself. In addition, the feed water system of the invention permits dual acid and phosphate scale treatment.

While the invention has been disclosed with respect to a particular distilling apparatus and further while only a single embodiment of the invention has been shown and described, it is not intended to be limited thereby but only by the scope of the appended claims.

We claim:

1. In a multi-effect film evaporator having a plurality of effects operable at successively lower temperatures and pressures with each effect including heat exchange tube means for passing a vapor and a feed liquid in heat exchange relation to vaporize at least a portion of the feed liquid and to condense at least a portion of the vapor, means for delivering the unevaporated liquid in each effect except the last to the heat exchange tube means of succeeding effects to comprise at least the portion of the feed liquid thereof and means for delivering the evaporated liquid in each effect except the last as the vapor to be condensed in the next succeeding lower temperature effect,     means for operating a first group of said effects at sequentially lower temperatures above a predetermined temperature and a second group of said effects at sequentially lower temperatures below said predetermined temperature, the improvement comprising:

first feed liquid delivery means coupled to the effects of said first group for delivering feed liquid thereto,     a second feed liquid delivery means for delivering feed liquid to effect of said second group of effects,     first chemical treating means including a source of a first material taken from the group consisting of acid and an acid salt, coupled to the first feed liquid delivery means for treating the feed liquid therein with said first material which is operable to prevent scale formation at temperatures above said predetermined temperature,     second chemical treating means including a source of polyphosphate coupled to the second feed liquid delivery means for treating the feed liquid therein with said polyphosphate which is operable to prevent scale formation below said predetermined temperature, said polyphosphate being inoperative to prevent scale formation above said predetermined temperature,     the flow paths of said feed liquid in said first and second feed liquid delivery means being isolated from each other between said first and second chemical treating means and said groups of corresponding effects.

2. The evaporator set forth in claim 1, wherein said first feed liquid delivery means includes first feed liquid preheater means for preheating said feed liquid therein to a temperature in excess of about 190°F and said second feed liquid delivery means includes second feed liquid preheater means for preheating the feed liquid therein to a temperature less than about 190°F.

3. The invention set forth in claim 1 wherein said first feed liquid delivery means is coupled to each of the effects of said first group for providing a separate quantity of feed liquid to each of said first group of effects, said second feed liquid delivery means being coupled to the effects of each of said second group, said first and second feed liquid delivery means feeding a separate and distinct quantity of feed liquid to each of associated effects.

4. The invention set forth in claim 2 and including a first plurality of heat exchange means, one of said first plurality of heat exchange means being disposed in each of said effects and a heat exchange means disposed in each of said second groups of effects, said first plurality of heat exchange means being connected in said first feed liquid distribution means for heating the quantities of feed liquid provided to each of the first group of effects, each of said second heat exchange means being connected in said second feed liquid distribution means for heating the quantities of feed liquid provided to each of said second group of effects.

5. An evaporator including a plurality of chambers, each chamber including heat exchange means for placing a feed liquid and a vapor in an indirect heat exchange relation so that at least a portion of said vapor condenses, said chambers being operable at successively lower temperatures for sequential flow of liquid therethru, with a first portion of said chambers comprising a first plurality of effects being operated at temperatures above a temperature of about 190° and a second portion of said chambers comprising a second plurality of effects being operated below said temperature, first feed liquid distribution means for providing feed liquid to each of the first plurality of chambers and second feed liquid distribution means for providing another separate quantity of feed liquid to each of the second plurality of chambers, first treating means including a source of acid for treating the feed liquid in said first feed liquid distribution means with said acid to prevent scale formation in the first portion of said chambers and second treating means including a source of polyphosphate for treating the other feed liquid in said second feed liquid distribution means with said polyphosphate to prevent scale formation in the remaining lower temperature effects.

6. The evaporator set forth in claim 5 and including means for feeding the vaporized portion of feed liquid generated in each chamber as the vapor to be condensed in the next succeeding lower temperature chamber.

7. The evaporator set forth in claim 6 wherein said first feed liquid distribution means includes first feed liquid preheater means disposed in at least some of the first portion of said chambers for preheating said feed liquid therein to a temperature in excess of about 190°F and said second feed liquid distribution means includes second feed liquid preheater means disposed in communication with at least some of said second plurality of chambers for preheating the feed liquid therein to a temperature less than about 190°F.

8. An evaporator including a plurality of successive effects, said effects being operated at successively lower temperatures and pressures for sequential flow of liquid therethru, each effect including heat exchange tube means for placing a liquid and a vapor in heat exchange relation so that a portion of said liquid vaporizes and at least a portion of said vapor condenses, feed liquid distribution means associated with each effect for distributing a quantity of feed water as a film over the exterior surfaces of said heat exchange tubes, vapor distribution means for providing the vaporized portion of the feed liquid generated in each effect to the interiors of the heat exchange tubes of the next lower temperature effect, said feed liquid distribution means including means for providing an initial quantity of feed liquid to the initial effect and a separate quantity of feed liquid to each of the remaining effects, said separate quantities of feed liquid being unconcentrated in the preceding effects, said feed liquid distribution means also including a first plurality of feeding means coupled to the effects above a predetermined temperature and a second plurality of feeding means coupled to the remaining effects below said predetermined temperature, first treating means including a source of acid for treating the feed liquid in said first plurality of feeding means with said acid to prevent scale formation in the higher temperature effects and second treating means for treating the second feeding means with polyphosphate to prevent scale formation in the remaining lower temperature effects.

9. The evaporator set forth in claim 8 wherein said feed liquid distribution means includes first feed liquid preheater means disposed in at least some of the effects above said predetermined temperatures for preheating said feed liquid therein to a temperature in excess of about 190°F and second feed liquid preheater means disposed in communication with at least some of said remaining effects for preheating the feed liquid therein to a temperature of less than about 190°F.

10. A method of distilling liquid which includes the steps of placing feed liquid and vapor in a heat exchange relation in each effect of a multi-effect evaporator so that a portion of the feed liquid is evaporated and the vapor is condensed as the product distillate of the system, providing an initial quantity of feed liquid to the initial one of the effects and separate quantities of feed liquid to each of the other effects, providing the vaporized portion of the liquid in each effect except the last to a succeeding effect as the heating vapor thereof and passing the unevaporated liquid in each effect except the last to a succeeding lower temperature effect, the improvement comprising;
  operating a first group of said effects at sequentially lower temperatures above a predetermined temperature and a second group of effects at sequentially lower temperatures below said predetermined temperature,
  preheating the feed liquid provided to the first group of effects to temperatures in excess of said predetermined temperature and feeding the thus preheated feed to said first group of effects,
  preheating the remaining feed liquid to temperatures below said predetermined temperature and feeding the thus preheated feed to said group of effects,
  adding to the feed liquid provided to the first group of effects an acid which is operable to suppress the formation of alkaline scales at temperatures above said predetermined temperature,
  and adding to the remaining feed liquid polyphosphate operable to suppress alkaline scale formation below said predetermined temperature but ineffective to prevent such formation above said temperature.

11. The method set forth in claim 10, wherein said temperature is about 195°F.

12. A method of distilling liquid in a multi-effect evaporator having a plurality of effects wherein feed liquid and vapor are placed in a heat exchange relation in each effect so that a portion of the feed liquid is evaporated and the vapor is condensed, and wherein the unevaporated feed liquid in each effect is conducted to the next succeeding lower temperature effect and the evaporated feed liquid in each effect is conducted to the next succeeding lower temperature effect as the vapor therein, the improvement comprising:
  operating a first plurality of said effects at sequentially lower temperatures above about 195°F and operating a second plurality of said effects at sequentially lower temperatures below said temperature, heating a first quantity of feed liquid above said temperature, providing said first quantity of feed liquid to at least one of the first plurality of effects, heating a second quantity of feed liquid to a temperature below said temperature, providing said second quantity of feed liquid to at least one of the second plurality of effects, treating said first quantity of feed liquid with an acid operable to prevent the formation of alkaline scale at temperatures above said temperature, and treating said second quantity of feed liquid with polyphosphate operable to prevent the formation of alkaline scale at temperatures below said temperature, said polyphosphate being ineffective to prevent scale formation above said temperature.

13. A method of distilling liquid including the steps of placing liquid and vapor in a heat exchange relation in each effect of a multi-effect evaporator so that a portion of the liquid is evaporated and the vapor is condensed as the product distillate of the system, maintaining said effects at successively lower temperatures for sequential flow of liquid therethru heating a first quantity of feed liquid above a temperature of about 195°F, providing said first quantity of feed liquid to each of said effects whose temperature is above said temperature, heating a second quantity of feed liquid below said temperature, providing said second quantity of feed liquid to each of said effects operating below said temperature, treating said first quantity of feed liquid with a first chemical agent taken from a group consisting of acid and an acid salt to prevent the formation of alkaline scale at temperatures above said temperature and treating said second quantity of feed liquid with a polyphosphate to prevent the formation of alkaline scale at temperatures below said temperature.

14. The method set forth in claim 13 including the step of conducting at least a portion of the vapor produced in each of said effects except the last effect to the next succeeding lower temperature effect for being condensed therein and for evaporating a portion of the liquid in said lower temperature effect.

* * * * *